United States Patent
Kasahara

(10) Patent No.: US 8,413,422 B2
(45) Date of Patent: Apr. 9, 2013

(54) OXIDATION CATALYST FAULT DIAGNOSIS UNIT AND OXIDATION CATALYST FAULT DIAGNOSIS METHOD AND INTERNAL COMBUSTION ENGINE EXHAUST PURIFICATION APPARATUS

(75) Inventor: Hiroyuki Kasahara, Saitama (JP)

(73) Assignee: Bosch Corporation, Tokyo (JP)

( * ) Notice: Subject to any disclaimer, the term of this patent is extended or adjusted under 35 U.S.C. 154(b) by 0 days.

(21) Appl. No.: 12/866,963

(22) PCT Filed: Oct. 14, 2008

(86) PCT No.: PCT/JP2008/068526
§ 371 (c)(1),
(2), (4) Date: Aug. 10, 2010

(87) PCT Pub. No.: WO2009/101728
PCT Pub. Date: Aug. 20, 2009

(65) Prior Publication Data
US 2010/0319316 A1 Dec. 23, 2010

(30) Foreign Application Priority Data
Feb. 15, 2008 (JP) .................................. 2008-033913

(51) Int. Cl.
*F01N 11/00* (2006.01)
*F01N 3/10* (2006.01)
*F02B 27/04* (2006.01)

(52) U.S. Cl.
USPC .............................................. 60/277; 60/285

(58) Field of Classification Search ................... 60/277, 60/285
See application file for complete search history.

(56) References Cited

U.S. PATENT DOCUMENTS
2007/0199309 A1 * 8/2007 Yano et al. ................... 60/286

FOREIGN PATENT DOCUMENTS
| JP | 2001221037 A | 8/2001 |
|---|---|---|
| JP | 2003120399 | 4/2003 |
| JP | 2006022735 A | 1/2006 |
| JP | 200627627 | 2/2006 |
| JP | 2006125323 A | 5/2006 |

* cited by examiner

*Primary Examiner* — Kenneth Bomberg
*Assistant Examiner* — Brandon Lee
(74) *Attorney, Agent, or Firm* — Michael Best & Friedrich LLP

(57) ABSTRACT

An oxidation catalyst fault diagnosis unit and fault diagnosis method. An oxidation catalyst fault diagnosis unit which performs fault diagnosis of an oxidation catalyst placed on the downstream side of the reduction catalyst, the oxidation catalyst fault diagnosis being equipped with a reducing agent dosage calculating portion that sets a dosage of the reducing agent such that a predetermined quantity of the ammonia flows out to the downstream side of the reduction catalyst, an oxidation efficiency calculating portion that obtains the efficiency with which the predetermined quantity of ammonia flowing out to the downstream side of the reduction catalyst is oxidized by the oxidation catalyst when the predetermined quantity of ammonia passes through the oxidation catalyst, and a fault determining portion that performs determination of whether or not the oxidation catalyst is faulty by comparing the oxidation efficiency with a predetermined reference value.

4 Claims, 5 Drawing Sheets

OXIDATION CATALYST FAULT DIAGNOSIS UNIT AND OXIDATION CATALYST FAULT DIAGNOSIS METHOD AND INTERNAL COMBUSTION ENGINE EXHAUST PURIFICATION APPARATUS

TECHNICAL FIELD

The present invention relates to an oxidation catalyst fault diagnosis unit and an oxidation catalyst fault diagnosis method and to an internal combustion engine exhaust purification apparatus. More particularly, the present invention relates to an oxidation catalyst fault diagnosis unit and an oxidation catalyst fault diagnosis method that perform fault diagnosis of an oxidation catalyst placed on the downstream side of a reduction catalyst that performs $NO_x$ reduction using ammonia and to an internal combustion engine exhaust purification apparatus.

BACKGROUND ART

Nitrogen oxides ($NO_x$), which can have an impact on the environment, are included in exhaust gas emitted from internal combustion engines such as diesel engines. Conventionally, as one aspect of exhaust purification apparatus used for purifying these $NO_x$, there are known SCR (Selective Catalytic Reduction) systems where a selective reduction catalyst is disposed in an exhaust passage and where reduction and purification of $NO_x$ is performed using ammonia in this selective reduction catalyst. These SCR systems deliver a reducing agent such as an urea solution capable of generating ammonia to the exhaust passage on the upstream side of the selective reduction catalyst, adsorb the generated ammonia in the selective reduction catalyst, and selectively reduce and purify $NO_x$ in the exhaust gas flowing into the selective reduction catalyst.

The saturated adsorption quantity of ammonia in the selective reduction catalyst used in these SCR systems has the characteristic that it changes depending on the catalyst temperature. Further, this selective reduction catalyst has the characteristic that the higher the actual adsorption rate of ammonia with respect to the saturated adsorption quantity of ammonia is, the higher the $NO_x$ reduction efficiency becomes. For that reason, control of the dosage of the reducing agent such as the urea solution is performed such that ammonia does not flow out to the downstream side of the selective reduction catalyst and such that the actual adsorption rate with respect to the saturated adsorption quantity becomes as high as possible.

However, sometimes some of the generated ammonia flows out to the downstream side of the selective reduction catalyst due to error in the dosage of the reducing agent instructed by a control unit or degradation of the SCR system over time. The toxicity of ammonia is higher than that of $NO_x$, and a situation where the ammonia is released into the atmosphere without being used for the reduction reaction should be avoided as much as possible. For that reason, there is an SCR system equipped with an oxidation catalyst on the downstream side of the selective reduction catalyst, and when some of the ammonia flows out to the downstream side of the selective reduction catalyst, the oxidation catalyst oxidizes that ammonia, breaks it down into nitrogen gas ($N_2$) and water ($H_2O$), and releases the nitrogen gas and water.

But sometimes the efficiency of the oxidation catalyst drops because of faults including thermal degradation, degradation over time, and cracks. When a fault arises in the oxidation catalyst, the oxidation catalyst cannot sufficiently oxidize and break down the ammonia flowing out to the downstream side of the selective reduction catalyst, and there is the potential for the ammonia to be released into the atmosphere.

Thus, there has been proposed an exhaust purification apparatus configured such that it can perform degradation determination of the oxidation catalyst. Specifically, there has been disclosed an exhaust purification apparatus equipped with an oxidation catalyst that is disposed on the downstream side of a reduction catalyst and oxidizes ammonia in exhaust, second concentration detecting means that detects the concentration of ammonia in exhaust downstream of the oxidation catalyst, and second concentration estimating means that estimates the concentration of ammonia in exhaust downstream of the oxidation catalyst, and when the difference between the concentration of ammonia detected by the second concentration detecting means and the concentration of ammonia estimated by the second concentration estimating means becomes equal to or greater than a second predetermined value, the exhaust purification apparatus determines that the oxidation catalyst has degraded (see patent document 1).

Patent Document 1: JP-A-2006-125323 (claims 4, [0022] to [0027])

DISCLOSURE OF THE INVENTION

Problem that the Invention is to Solve

However, the exhaust purification apparatus described in patent document 1 performs degradation determination of the oxidation catalyst by comparing, with the second predetermined value, the difference between the concentration of ammonia that has actually been detected on the downstream side of the oxidation catalyst and the concentration of ammonia on the downstream of the side of the oxidation catalyst that is estimated. The concentration of ammonia on the downstream side of the oxidation catalyst that is estimated or actually detected fluctuates depending on the operating conditions of the internal combustion engine, so when degradation determination is performed using as a reference the second predetermined value that has been prescribed beforehand, there is the potential for the reliability of the diagnosis result to become low. That is, when the second predetermined value is set high, there is the potential for the exhaust purification apparatus to be unable to perform degradation determination of the oxidation catalyst unless the quantity of ammonia flowing out to the downstream side of the oxidation catalyst becomes equal to or greater than a certain constant. Further, when the second predetermined value is set low, depending on the operating conditions, a case where the oxidation catalyst has in actuality not degraded even when the difference between the concentrations of ammonia described above becomes equal to or greater than the second predetermined value is also envisaged.

Consequently, in the oxidation catalyst degradation determination method described in patent document 1, there is the potential for the operating conditions under which degradation determination is performed to be constrained and for the reliability of the determination result to become low.

Thus, the inventors of the present invention made every effort to discover that the problem described above can be solved by an oxidation catalyst fault diagnosis unit being equipped with a calculating portion that easily calculates the oxidation efficiency of an oxidation catalyst disposed on the downstream side of a selective reduction catalyst and performing fault diagnosis of the oxidation catalyst by determining whether or not the oxidation efficiency has dropped, and thus the inventors completed the present invention. That is, it is an object of the present invention to provide an oxidation catalyst fault diagnosis unit and an oxidation catalyst fault diagnosis method where the oxidation efficiency of an oxidation catalyst is easily calculated even under various operating conditions that fluctuate and where fault diagnosis of the oxidation catalyst is performed with good precision in a desired time period and an internal combustion engine exhaust purification apparatus equipped with the oxidation catalyst fault diagnosis unit.

Means for Solving the Problem

According to the present invention, there is provided an oxidation catalyst fault diagnosis unit which, in an exhaust purification apparatus of an internal combustion engine that delivers a reducing agent capable of generating ammonia to an exhaust passage on the upstream side of a reduction catalyst and selectively reduces and purifies $NO_x$ in exhaust with the reduction catalyst, is for performing fault diagnosis of an oxidation catalyst placed on the downstream side of the reduction catalyst, the oxidation catalyst fault diagnosis unit comprising a reducing agent dosage calculating portion that sets a dosage of the reducing agent such that a predetermined quantity of the ammonia flows out to the downstream side of the reduction catalyst, an oxidation efficiency calculating portion that obtains the efficiency with which the predetermined quantity of ammonia flowing out to the downstream side of the reduction catalyst is oxidized by the oxidation catalyst when the predetermined quantity of ammonia passes through the oxidation catalyst, and a fault determining portion that performs determination of whether or not the oxidation catalyst is faulty by comparing the oxidation efficiency with a predetermined reference value, whereby the problem described above can be solved.

Further, in configuring the oxidation catalyst fault diagnosis unit of the present invention, it is preferred that the oxidation efficiency is calculated on the basis of a value of an upstream-side $NO_x$ sensor placed on the downstream side of the reduction catalyst and on the upstream side of the oxidation catalyst, a value of a downstream-side $NO_x$ sensor placed on the downstream side of the oxidation catalyst, and an estimated quantity of $NO_x$ in the exhaust on the downstream side of the reduction catalyst and on the upstream side of the oxidation catalyst.

Further, in configuring the oxidation catalyst fault diagnosis unit of the present invention, it is preferred that the oxidation efficiency is calculated on the basis of an estimated quantity of $NO_x$ and an estimated quantity of ammonia on the downstream side of the reduction catalyst and on the upstream side of the oxidation catalyst and a value of a downstream-side $NO_x$ sensor placed on the downstream side of the oxidation catalyst.

Further, in configuring the oxidation catalyst fault diagnosis unit of the present invention, it is preferred that the oxidation catalyst fault diagnosis unit further comprises a quantity of ammonia for purification calculating portion that calculates a quantity of ammonia for purification that is needed in order to purify $NO_x$ in the exhaust flowing into the reduction catalyst and an adsorbable quantity of ammonia calculating portion that calculates an adsorbable quantity of the ammonia by subtracting a current estimated adsorption quantity from a saturated adsorption quantity corresponding to the temperature of the reduction catalyst, wherein the reducing agent dosage calculating portion sets the dosage of the reducing agent by adding a predetermined quantity to the reducing agent quantity with respect to the adsorbable quantity and the quantity of ammonia for purification.

Further, in configuring the oxidation catalyst fault diagnosis unit of the present invention, it is preferred that the oxidation catalyst fault diagnosis unit further comprises an exhaust temperature detecting portion that detects the exhaust temperature, wherein fault diagnosis of the oxidation catalyst is performed when the amplitude of the exhaust temperature is within a predetermined range and the exhaust temperature is stable.

Further, another aspect of the present invention is a method of diagnosing faults in an oxidation catalyst which, in an exhaust purification apparatus of an internal combustion engine that delivers a reducing agent capable of generating ammonia to an exhaust passage on the upstream side of a reduction catalyst and selectively reduces and purifies $NO_x$ in exhaust with the reduction catalyst, is placed on the downstream side of the reduction catalyst, the oxidation catalyst fault diagnosis method comprising: delivering the reducing agent such that a predetermined quantity of the ammonia flows out to the downstream side of the reduction catalyst; and performing fault determination of the oxidation catalyst by comparing, with a predetermined reference value, the purification efficiency with which the predetermined quantity of ammonia is oxidized and purified by the oxidation catalyst when the predetermined quantity of ammonia passes through the oxidation catalyst.

Further, still another aspect of the present invention is an internal combustion engine exhaust purification apparatus comprising any of the oxidation catalyst fault diagnosis units described above.

Advantageous Effects of the Invention

According to the oxidation catalyst fault diagnosis unit and the oxidation catalyst fault diagnosis method of the present invention, focusing on the characteristic that a $NO_x$ sensor also reacts to ammonia, the reducing agent is delivered such that a predetermined quantity of the ammonia flows out to the downstream side of the reduction catalyst, the ratio of ammonia oxidized by the oxidation catalyst placed on the downstream side of the reduction catalyst is calculated, and fault diagnosis of the oxidation catalyst is performed, so fault diagnosis of the oxidation catalyst is performed with good precision in a desired time period regardless of the operating state of the internal combustion engine. Further, determination of whether or not the oxidation catalyst is faulty is performed on the basis of the oxidation efficiency of the oxidation catalyst, so determination of whether or not the oxidation catalyst is faulty is performed with good precision even under various operating conditions. Consequently, there are provided an oxidation catalyst fault diagnosis unit and an oxidation catalyst fault diagnosis method where there are fewer constraints on the time period of diagnosis and where fault diagnosis of the oxidation catalyst is performed with good precision.

Further, according to the internal combustion engine exhaust purification apparatus of the present invention, the exhaust purification apparatus is equipped with the fault diagnosis unit where fault diagnosis of the oxidation catalyst is performed in a desired time period regardless of the operating state and operating conditions of the internal combustion engine, so there is provided an exhaust purification apparatus where the ammonia is efficiently oxidized by the oxidation catalyst and release of the ammonia into the atmosphere is prevented even when the ammonia flows out to the downstream side of the reduction catalyst.

BEST MODES FOR CARRYING OUT THE INVENTION

Figure 1:
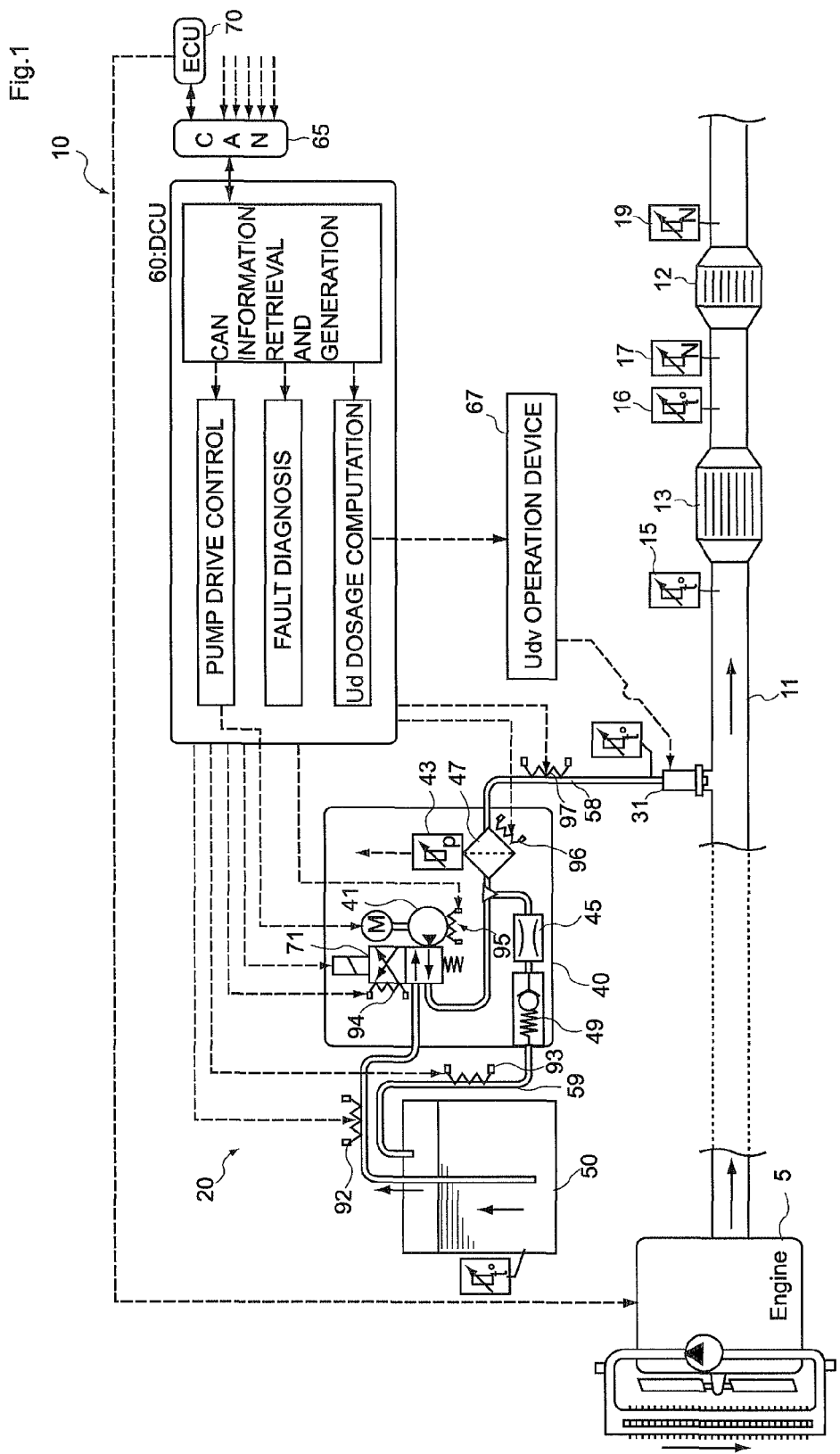
FIG. 1 is a diagram showing a configural example of an exhaust purification apparatus pertaining to a first embodiment of the present invention.

Embodiments relating to an oxidation catalyst fault diagnosis unit and fault diagnosis method and an exhaust purification apparatus equipped with the fault diagnosis unit will be specifically described below with reference to the drawings. However, these embodiments represent one aspect of the present invention, are not intended to limit this invention, and are capable of being arbitrarily altered within the scope of the present invention.

In the drawings, members to which the same reference numerals have been given represent the same members, and description thereof will be appropriately omitted.

First Embodiment

1. Exhaust Purification Apparatus

First, the basic configuration of an exhaust purification apparatus pertaining to a first embodiment of the present invention equipped with the oxidation catalyst fault diagnosis unit will be described with reference to FIG. 1.

An exhaust purification apparatus 10 shown in FIG. 1 is an exhaust purification apparatus 10 that injects and delivers an urea aqueous solution serving as a reducing agent to the upstream side of a reduction catalyst 13 disposed in an exhaust passage and selectively reduces and purifies $NO_x$ included in exhaust gas in the reduction catalyst 13. This exhaust purification apparatus 10 takes as its main elements and is equipped with the reduction catalyst 13 that is disposed in an exhaust pipe 11 connected to an internal combustion engine 5 and is for selectively reducing $NO_x$ included in the exhaust gas, a reducing agent delivery device 20 that includes a reducing agent injection valve 31 for injecting and delivering the reducing agent into the exhaust pipe 11 on the upstream side of the reduction catalyst 13, and an oxidation catalyst 12 that is disposed on the downstream side of the reduction catalyst 13.

Conventionally publicly known components are used for these basic components of the exhaust purification apparatus 10.

For example, the reducing agent delivery device 20 used in the present embodiment is equipped with the reducing agent injection valve 31 that is fixed to the exhaust pipe 11 on the upstream side of the reduction catalyst 13, a storage tank 50 in which the urea aqueous solution serving as the reducing agent is stored, a pump module 40 that includes a pump 41 that pressure-feeds the reducing agent inside the storage tank 50 to the reducing agent injection valve 31, and a control unit (hereinafter called a DCU (Dosing Control Unit)) 60 that performs control of the reducing agent injection valve 31 and the pump 41 in order to control the dosage of the reducing agent injected and delivered into the exhaust pipe 11.

Further, in the example of the exhaust purification apparatus 10 shown in FIG. 1, the DCU 60 is connected to a CAN 65. A control unit (hereinafter called an ECU (Electronic Control Unit)) 70 for controlling the operating state of the internal combustion engine is connected to this CAN 65, and not only information relating to the operating state of the internal combustion engine including the fuel injection quantity, the injection timing and the number of revolutions written in the CAN 65, but also information of all sensors and the like disposed in the exhaust purification apparatus 10 is written in the CAN 65. Additionally, the DCU 60 connected to the CAN 65 reads information on the CAN 65 and outputs information onto the CAN 65.

In the present embodiment, the ECU 70 and the DCU 60 comprise separate control units and are configured such that they can exchange information via the CAN 65, but the ECU 70 and the DCU 60 may also be configured as one control unit.

Further, as the reducing agent injection valve 31, an ON-OFF valve whose ON-OFF switching is controlled by duty control, for example, is used. The reducing agent pressure-fed from the pump module 40 to the reducing agent injection valve 31 is maintained at a predetermined pressure, and the reducing agent is delivered into the exhaust passage when the reducing agent injection valve 31 is opened by a control signal sent from the DCU 60.

Further, the pump module 40 is equipped with the pump 41, and the pump 41 pumps the reducing agent inside the storage tank 50 and pressure-feeds the reducing agent to the reducing agent injection valve 31. This pump 41 comprises a motor-driven diaphragm pump or gear pump, for example, and drive control thereof is performed by a signal sent from the DCU 60. Further, a pressure sensor 43 is disposed in a delivery passage 58 that interconnects the pump 41 and the reducing agent injection valve 31, and the value detected by the pressure sensor 43 is outputted to the DCU 60 as a signal. In the DCU 60, feedback control of the pump 41 is performed such that the pressure value inside the delivery passage 58 is maintained at a predetermined value on the basis of the sensor value of the pressure sensor 43. That is, the drive duty of the pump 41 is controlled so as to become larger in a state where the pressure inside the delivery passage 58 drops below the predetermined value, and the drive duty of the pump 41 is controlled so as to become smaller in a state where the pressure inside the delivery passage 58 rises above the predetermined value.

The "drive duty of the pump" means the percentage of pump drive time occupying one cycle in PWM (pulse width modulation) control.

Further, a circulation passage 59 is disposed branching from the delivery passage 58 and is connected to the storage tank 50. In this circulation passage 59, an orifice 45 is disposed and also a pressure control valve 49 is disposed on the storage tank 50 side of the orifice 45. Because the reducing agent delivery device 20 is equipped with this circulation passage 59, the pressure control valve 49 opens and some of the reducing agent is refluxed back inside the storage tank 50 when the pressure value inside the delivery passage 58 exceeds the predetermined value in a state where the reducing agent is pressure-fed by the pump 41 that is feedback-controlled on the basis of the detection value of the pressure sensor 43. As the pressure control valve 49, for example, a publicly known check valve or the like is used.

Further, the pump module 40 is equipped with a reversing valve 71, and when delivery of the reducing agent is not performed by the reducing agent delivery device 20, the pump 41 is driven, whereby the reducing agent in the reducing agent delivery system including the pump module 40, the reducing agent injection valve 31 and the delivery passage 58 is recovered in the storage tank 50. Consequently, under temperature conditions where the reducing agent easily freezes, such as when it is cold, freezing of the reducing agent inside the reducing agent delivery system is prevented when the internal combustion engine 5 stops and delivery of the reducing agent by the reducing agent delivery device 20 is not performed, and when operation of the internal combustion engine is resumed thereafter, it is ensured that there are no injection defects resulting from clogging inside the reducing agent delivery system.

This reversing valve 71 is, for example, a switching valve having the function of switching the flow path of the reducing agent from a forward direction from the storage tank 50 to the pump module 40 to a reverse direction from the pump module 40 to the storage tank 50, and when the ignition switch of the internal combustion engine is switched OFF, the flow path is switched to the reverse direction and the reducing agent is recovered inside the storage tank 50.

Further, heaters 92 to 97 are disposed in respective sites in the reducing agent delivery system of the reducing agent delivery device 20. These heaters 92 to 97 are disposed in order to prevent a situation where, when the reducing agent exists inside the reducing agent delivery system such as when it is cold, the reducing agent freezes such that the reducing agent delivery system becomes partially or completely blocked and delivery control of the reducing agent by the reducing agent injection valve 31 is no longer accurately performed. Further, these heaters 92 to 97 are powered and controlled by the DCU 60. For example, power is supplied from a battery and the reducing agent delivery system is heated in situations where it is judged that the reducing agent is under a temperature condition where it will freeze in the reducing agent delivery system on the basis of the temperature of the reducing agent and the outdoor air temperature.

These heaters 92 to 97 are not particularly limited; for example, electrical heating wires are used.

Further, the reduction catalyst 13 disposed in the exhaust passage adsorbs ammonia generated as a result of the reducing agent injected and delivered by the reducing agent delivery device 20 undergoing hydrolysis and reduces and purifies $NO_x$ in the inflowing exhaust gas. Consequently, when the quantity of ammonia being adsorbed is insufficient, some $NO_x$ flow out to the downstream side of the reduction catalyst without being reduced, so dosage control of the reducing agent is performed such that a predetermined quantity or more of the ammonia is always adsorbed by the reduction catalyst 13.

Figure 2:
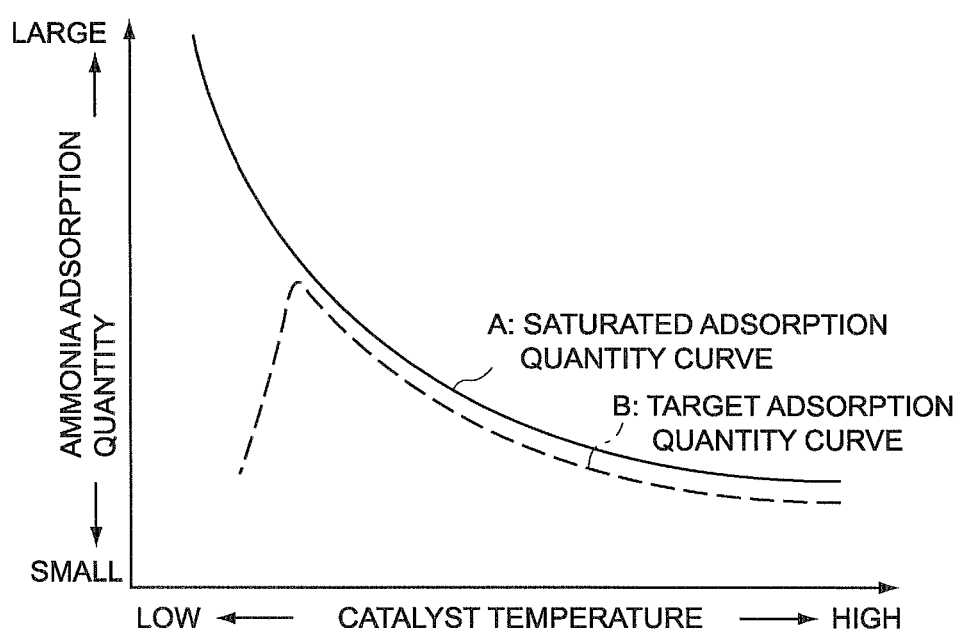
FIG. 2 is a diagram for describing a saturated adsorption quantity and a target adsorption quantity of an oxidation catalyst.

As shown in FIG. 2, this reduction catalyst 13 has the characteristic that the saturated adsorption quantity of ammonia (solid line A) changes depending on the catalyst temperature. It is known that the hazardousness of ammonia is higher as compared to that of $NO_x$, so in the exhaust purification apparatus of the present embodiment, when dosage control of the reducing agent is performed in a normal operating state of the internal combustion engine, a target adsorption quantity (dotted line B) smaller than the saturated adsorption quantity is set and dosage control is performed such that the ammonia does not flow out to the downstream side of the reduction catalyst.

But when the saturated adsorption quantity of ammonia drops near the actual adsorption quantity, such as when the temperature of the reduction catalyst 13 sharply rises because of a sharp change in the exhaust gas temperature, there is the potential for some of the generated ammonia to flow out to the downstream side of the reduction catalyst 13 without being adsorbed by the reduction catalyst 13 or for some of the ammonia that had been adsorbed by the reduction catalyst 13 to desorb and flow out to the downstream side of the reduction catalyst 13. For that reason, in the exhaust purification apparatus 10 of the present embodiment, the oxidation catalyst 12 is disposed on the downstream side of the reduction catalyst 13 so that ammonia that flows out without being adsorbed by the reduction catalyst 13 is oxidized. That is, outflowing ammonia is oxidized in the oxidation catalyst 12 and is broken down into nitrogen gas ($N_2$) and water ($H_2O$), and the nitrogen gas and water are released.

Further, a first $NO_x$ sensor 17 is disposed between the reduction catalyst 13 and the oxidation catalyst 12, and a second $NO_x$ sensor 19 is disposed further on the downstream side of the oxidation catalyst 12. It is known that these $NO_x$ sensors 17 and 19 react not only to $NO_x$ but also to the ammonia generated by hydrolysis of the reducing agent. For that reason, the sensor values detected by each of the $NO_x$ sensors 17 and 19 are combined values of the concentration of $NO_x$ and the concentration of ammonia in the exhaust gas.

Here, the oxidation catalyst 12 is disposed between the first $NO_x$ sensor 17 and the second $NO_x$ sensor 19, and although there is substantially no change in the quantities of $NO_x$ on the upstream side and the downstream side of the oxidation catalyst 12, the quantities of ammonia on the upstream side and the downstream side of the oxidation catalyst 12 decrease. For that reason, by subtracting a value (S2) obtained by integrating the sensor value (s2) of the second $NO_x$ sensor 19 from a value (S1) obtained by integrating the sensor value (s1) of the first $NO_x$ sensor 17, the quantity of ammonia that has been oxidized by the oxidation catalyst 12 (Uo) within a predetermined time period is calculated. Additionally, by dividing this quantity of ammonia that has been oxidized (Uo) by the quantity of ammonia on the upstream side of the oxidation catalyst 12 (Uu), the ratio of ammonia that has been oxidized by the oxidation catalyst 12 is calculated. In the oxidation catalyst fault diagnosis unit disposed in the exhaust purification apparatus 10 of the present embodiment, this ratio is used in fault diagnosis of the oxidation catalyst.

2. Control Unit (Oxidation Catalyst Fault Diagnosis Unit) of Reducing Agent Delivery Device (1) Basic Configuration In the DCU 60 disposed in the exhaust purification apparatus 10 shown in FIG. 1, basically operation control of the pump 41 and the reducing agent injection valve 31 is performed on the basis of various information existing on the CAN 65 such that an appropriate quantity of the reducing agent is delivered into the exhaust pipe 11. Further, the DCU 60 in the embodiments of the present invention is also equipped with a function as a fault diagnosis unit that diagnoses faults in the oxidation catalyst 12 disposed on the downstream side of the reduction catalyst 13.

In FIG. 1, there is shown a configural example where portions relating to operation control of the reducing agent injection valve 31 and drive control of the pump 41 and also fault diagnosis of the oxidation catalyst 12 are shown in functional blocks. This DCU 60 takes as its main components and is equipped with a CAN information retrieving and generating portion (in FIG. 1, written as "CAN information retrieval and generation"), a pump drive control portion (in FIG. 1, written as "pump drive control"), a reducing agent dosage calculating portion (in FIG. 1, written as "Ud dosage calculation"), and a fault diagnosing portion (in FIG. 1, written as "fault diagnosis"). Each of these portions is specifically realized by the execution of programs by a microcomputer (not shown).

Of these, the CAN information retrieving and generating portion reads, and outputs to each of the portions, information existing on the CAN 65 including information relating to the operating state of the internal combustion engine 5 outputted from the ECU 70 and sensor values outputted from temperature sensors and the $NO_x$ sensors. In particular, in the DCU 60 disposed in the exhaust purification apparatus of the present embodiment, information relating to the operating state of the internal combustion engine including the fuel injection quantity and the fuel injection timing and sensor values of each of the sensors disposed in the exhaust purification apparatus 10 are transmitted to each of the other portions via the CAN information retrieving and generating portion.

Further, the pump drive control portion continuously reads the sensor value of the pressure sensor 43 representing the pressure of the reducing agent inside the delivery passage 58 outputted from the CAN information retrieving and generating portion and feedback-controls the pump 41 on the basis of this sensor value. As a result, the pressure inside the delivery passage 58 is maintained in a substantially constant state. For example, in a case where the pump 41 is a motor-driven pump, when the outputted pressure value is lower than a target value, the duty ratio of the pump is controlled so as to become larger in order to raise the pressure, and conversely when the outputted pressure value exceeds the target value, the duty ratio of the pump is controlled so as to become smaller in order to lower the pressure.

The reducing agent dosage calculating portion, for example, subtracts an estimated adsorption quantity of the ammonia that is actually adsorbed from the target adsorption quantity corresponding to the temperature of the reduction catalyst in normal reducing agent dosage control, decides the dosage of the reducing agent such that a quantity of ammonia equal to the insufficient quantity is generated, and outputs an operation signal to a reducing agent injection valve operation device (in FIG. 1, written as "Udv operation device") 67 for operating the reducing agent injection valve 31.

When fault diagnosis of the oxidation catalyst is performed, the reducing agent dosage calculating portion obtains a quantity of the reducing agent that is needed in order for a combined quantity of ammonia obtained by adding together a quantity of ammonia for purification and an adsorbable quantity of ammonia calculated by a quantity of ammonia for purification calculating portion and an adsorbable quantity of ammonia calculating portion described later to be generated, further adds a predetermined quantity, and decides the dosage of the reducing agent. That is, in order to verify the ammonia oxidation efficiency in the oxidation catalyst, the dosage of the reducing agent is set so as to allow some of the ammonia to flow out to the downstream side of the reduction catalyst.

(2) Reducing Agent Delivery Control

Reduction and purification of $NO_x$ in the exhaust gas by the exhaust purification apparatus 10 shown in FIG. 1 is performed as follows.

When the internal combustion engine is operating, the reducing agent inside the storage tank 50 is pumped by the pump 41 and pressure-fed to the reducing agent injection valve 31. At this time, on the basis of the sensor value of the pressure sensor 43 on the downstream side of the pump 41 disposed in the pump module 40, the output of the pump 41 is raised when the sensor value is less than the predetermined value, and the reducing agent is returned to the storage tank 50 and depressurized via the pressure control valve 49 when the sensor value exceeds the predetermined value. Thus, the pressure of the reducing agent pressure-fed to the reducing agent injection valve 31 is maintained at a substantially constant value.

In a state where the reducing agent is delivered at a substantially constant pressure, the DCU 60 compares the target adsorption quantity corresponding to the temperature of the reduction catalyst 13 with the estimated adsorption quantity, decides the dosage of the reducing agent that is needed in order for a quantity of the ammonia equal to the insufficient quantity to be generated, generates a control signal corresponding thereto, and outputs the control signal to the reducing agent injection valve operation device 67. Then, control of the reducing agent injection valve 31 is performed by the reducing agent injection valve operation device 67, and an appropriate quantity of the reducing agent is delivered into the exhaust pipe 11. The reducing agent delivered into the exhaust pipe 11 flows into the reduction catalyst 13 in a state where the reducing agent is mixed with the exhaust gas, and the reducing agent is used in the reduction reaction of $NO_x$ included in the exhaust gas. In this manner, purification of the exhaust gas is performed.

(3) Oxidation Catalyst Fault Diagnosing Portion

Here, the DCU 60 disposed in the exhaust purification apparatus 10 of the present embodiment is equipped with the fault diagnosing portion that diagnoses faults in the oxidation catalyst 12. This is to ensure that replacement of the oxidation catalyst is quickly performed and that ammonia is not allowed to be released into the atmosphere when there is potentially a fault in the oxidation catalyst 12 because, as described above, the oxidation catalyst 12 has the important role of oxidizing ammonia, which has a relatively high toxicity.

Figure 3:
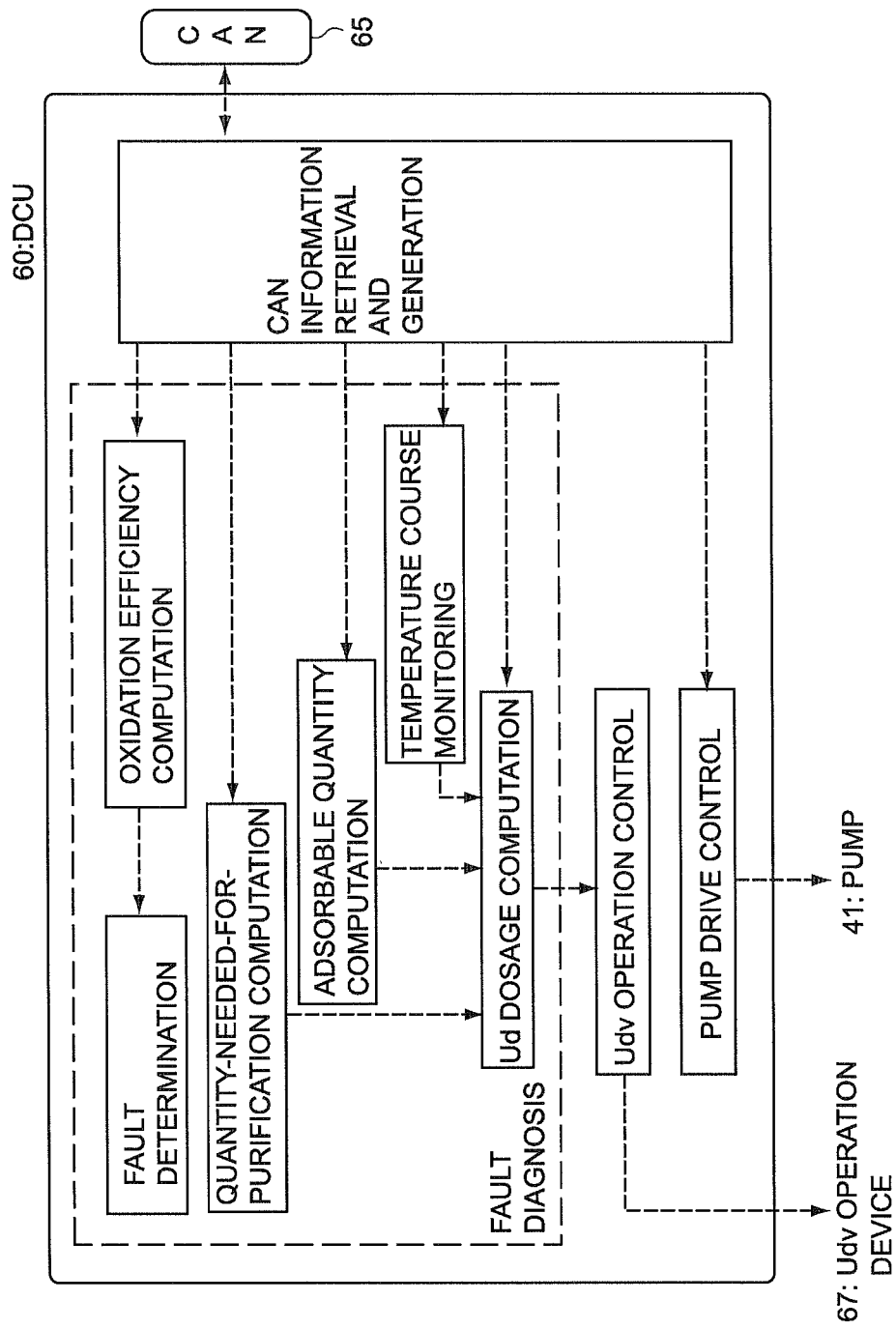
FIG. 3 is a block diagram showing a configural example of a DCU with which the exhaust purification apparatus of the first embodiment is equipped.

FIG. 3 shows in greater detail the configuration of the oxidation catalyst fault diagnosing portion of the configuration of the DCU 60. This fault diagnosing portion takes as its main elements and is equipped with a quantity of ammonia for purification calculating portion (written as "quantity-needed-for-purification calculation"), an adsorbable quantity of ammonia calculating portion (written as "adsorbable quantity calculation"), a reducing agent dosage calculating portion (written as "Ud dosage calculation"), an exhaust temperature course monitoring portion (written as "temperature course monitoring"), an oxidation efficiency calculating portion (written as "oxidation efficiency calculation"), and a fault determining portion (written as "fault determination"). Each of these portions is also specifically realized by the execution of programs by a microcomputer (not shown).

Of these, the quantity of ammonia for purification calculating portion calculates, on the basis of the quantity of $NO_x$ flowing into the reduction catalyst, a quantity of ammonia (m0) that is needed in order to reduce and purify these $NO_x$ by the reduction catalyst. In the DCU 60 disposed in the exhaust purification apparatus of the present embodiment, the quantity of $NO_x$ flowing into the reduction catalyst is calculated on the basis of information such as the operating state of the internal combustion engine and the exhaust temperature, but a $NO_x$ sensor may also be placed on the upstream side of the reduction catalyst 13 so that the quantity of $NO_x$ is calculated on the basis of the detected sensor value.

Further, the quantity of adsorbable ammonia calculating portion calculates a further adsorbable quantity of ammonia by subtracting the estimated adsorption quantity currently being adsorbed by the reduction catalyst from the saturated adsorption quantity corresponding to the temperature of the reduction catalyst. Specifically, as shown in FIG. 2, the saturated adsorption quantity of the reduction catalyst has a relationship where it decreases as the catalyst temperature rises, so the quantity of adsorbable ammonia calculating portion is equipped beforehand with a saturated adsorption quantity map, and the saturated adsorption quantity corresponding to the catalyst temperature is obtained on the basis of the catalyst temperature obtained beforehand by computation. Further, the estimated adsorption quantity of ammonia is obtained by integrating a value obtained by subtracting the quantity of ammonia that is needed in order to reduce and purify $NO_x$ (m0) from the target adsorption quantity in injection control of the reducing agent that had been performed up until then.

Further, when fault diagnosis of the oxidation catalyst is performed, the reducing agent dosage calculating portion calculates the quantity of the reducing agent with which only the combined quantity of ammonia is generated by adding the quantity of adsorbable ammonia to the quantity of ammonia for purification and also calculates the dosage of the reducing agent by further adding a predetermined quantity. This reducing agent dosage calculating portion is a portion shared with a reducing agent dosage calculating portion for performing control of the reducing agent dosage in the normal operating state, and when fault diagnosis of the oxidation catalyst is performed, calculation of the reducing agent dosage is performed as described above.

Further the DCU 60 disposed in the exhaust purification apparatus 10 of the present embodiment is equipped with the exhaust temperature course monitoring portion, and this exhaust temperature course monitoring portion monitors the course of the sensor value (the exhaust temperature) of a temperature sensor 15 sent from the CAN information retrieving and generating portion to discern whether or not a state where the amplitude of the exhaust temperature is within a predetermined range has continued an amount of time equal to greater than a predetermined amount of time. This is because, when fault diagnosis of the oxidation catalyst is performed, in a state where the exhaust temperature is unstable, sometimes the efficiency of the oxidation catalyst or the reduction catalyst changes, error arises in the quantity of ammonia allowed to flow out, and the reliability of the diagnosis result drops.

Consequently, even when the delivery instructed quantity is calculated in the reducing agent dosage calculating portion described above, fault diagnosis is not actually started when it is not discerned that the exhaust temperature is stable in the exhaust temperature course monitoring portion.

Further, the oxidation efficiency calculating portion calculates the efficiency with which the ammonia is oxidized by the oxidation catalyst after the reducing agent is delivered for fault diagnosis and the predetermined quantity of ammonia flows out to the downstream side of the reduction catalyst. Calculation of the ammonia oxidation efficiency in the oxidation efficiency calculating portion of the present embodiment is performed as follows.

The ammonia oxidation efficiency (X) of the oxidation catalyst is the ratio of the quantity of ammonia that has been oxidized by the oxidation catalyst (Uo) with respect to the quantity of ammonia on the upstream side of the oxidation catalyst (Uu) and is expressed as:

$$X = Uo/Uu \quad (1)$$

Here, the quantity of ammonia on the upstream side of the oxidation catalyst (Uu) is a value obtained by subtracting the quantity of $NO_x$ on the upstream side of the oxidation catalyst (Nu) from the value (S1) obtained by integrating the sensor value (s1) of the first $NO_x$ sensor and is expressed as:

$$Uu = S1 - Nu \quad (2)$$

This quantity of $NO_x$ on the upstream side of the oxidation catalyst (Nu) is, using an estimated reduction catalyst efficiency ($\eta$Est) based on the temperature and flow rate of the exhaust gas, the flow rate of $NO_x$ on the upstream side of the reduction catalyst, the ratio between $NO_2$ and NO on the upstream side of the reduction catalyst, the estimated ammonia adsorption quantity and the estimated HC (hydrocarbon) poisoning quantity of the reduction catalyst and the quantity of $NO_x$ on the upstream side of the reduction catalyst ($N_0$), expressed as:

$$Nu = N_0 - \eta Est \times N_0 \quad (3)$$

Further, as described above, the quantity of ammonia that has been oxidized by the oxidation catalyst 12 (Uo) is obtained by subtracting the value (S2) obtained by integrating the sensor value (s2) of the second $NO_x$ sensor from the value (S1) obtained by integrating the sensor value (s1) of the first $NO_x$ sensor. Consequently, the quantity of ammonia that has been oxidized by the oxidation catalyst 12 (Uo) is expressed as:

$$Uo = S1 - S2 \quad (4)$$

When expression (2) and expression (4) are assigned to expression (1), the ammonia oxidation efficiency (X) of the oxidation catalyst is expressed as:

$$X = (S1 - S2)/(S1 - Nu) \quad (5)$$

As shown in this expression (5), in the oxidation efficiency calculating portion of the DCU disposed in the exhaust purification apparatus of the present embodiment, the ammonia oxidation efficiency in the oxidation catalyst is calculated on the basis of the sensor values of the first and second $NO_x$ sensors and the estimated quantity of $NO_x$ on the upstream side of the oxidation catalyst.

Additionally, the fault determining portion compares the value of the ammonia oxidation efficiency calculated by the oxidation efficiency calculating portion with a predetermined reference value and determines that the oxidation catalyst is faulty when the value of the ammonia oxidation efficiency calculated by the oxidation efficiency calculating portion is less than the reference value. In this manner, by performing fault determination of the oxidation catalyst on the basis of the ratio of the quantity of ammonia that has been oxidized (Uo) with respect to the quantity of ammonia on the upstream side of the oxidation catalyst (Uu) rather than the absolute quantity of ammonia that has been oxidized, fault diagnosis of the oxidation catalyst is performed with good precision regardless of the operating state of the internal combustion engine.

That is, when fault diagnosis is performed by obtaining the absolute quantity of ammonia that has been oxidized with the assumption of allowing a prescribed quantity of ammonia to flow out to the downstream side of the reduction catalyst, when there is a change in the operating state of the internal combustion engine or the reduction catalyst temperature, sometimes error arises in the quantity of ammonia flowing out to the downstream side of the reduction catalyst and the quantity of ammonia that has been oxidized ends up decreasing despite the oxidation catalyst not being faulty. In contrast, when fault diagnosis is performed by obtaining the ratio of ammonia that has been oxidized, even when the quantity of ammonia flowing out to the downstream side of the reduction catalyst differs per diagnosis, the diagnosis result is not greatly affected.

3. Oxidation Catalyst Fault Diagnosis Method

Figure 4:
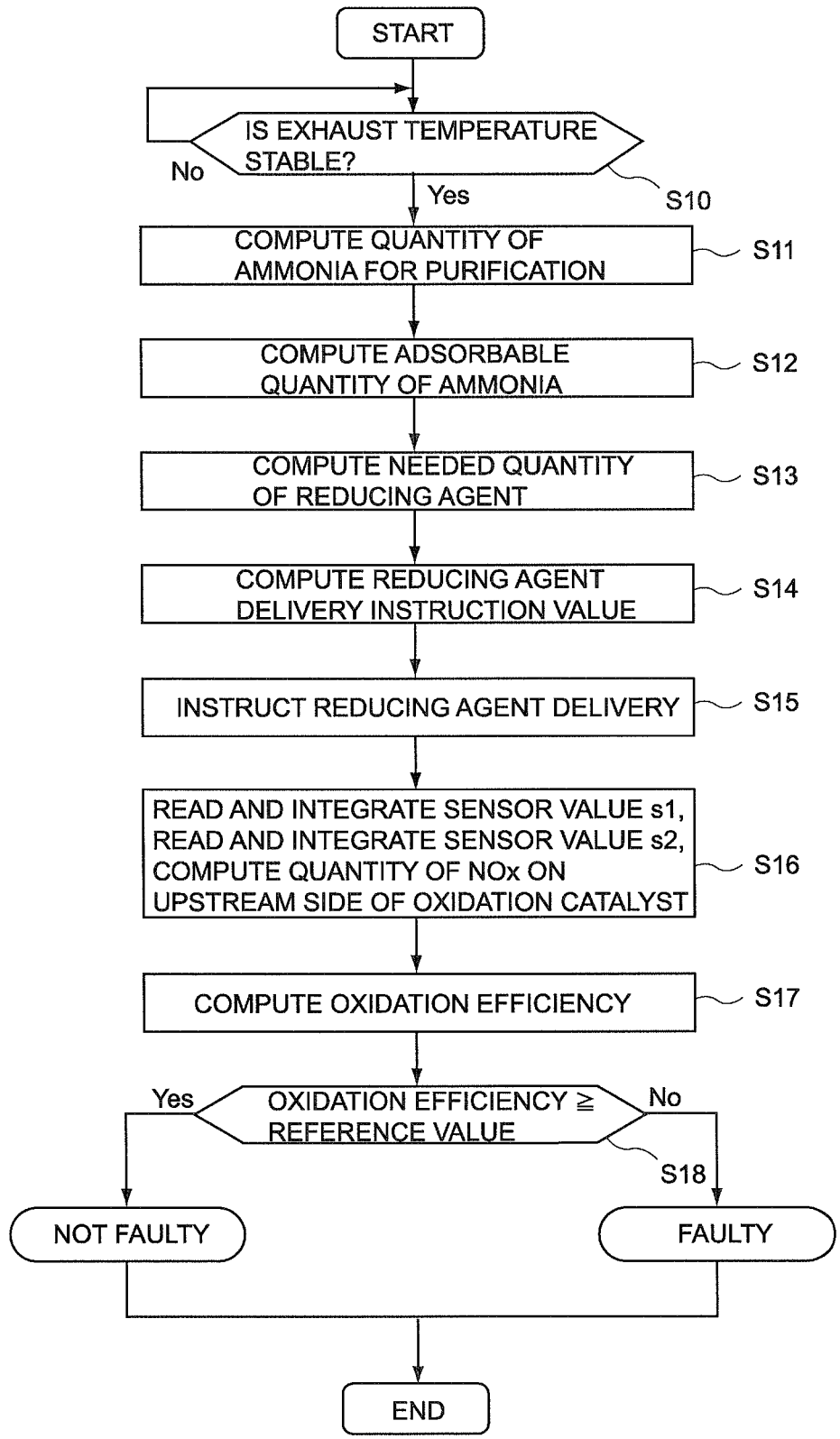
FIG. 4 is a diagram showing a flow of oxidation catalyst fault diagnosis performed by the exhaust purification apparatus of the first embodiment.

Next, one example of a specific routine of the oxidation catalyst fault diagnosis method will be described with reference to the flow of FIG. 4. This routine may be executed all the time or may be executed by interruption every certain amount of time.

First, in step S10, discernment of whether or not the exhaust temperature is stable is performed. In the case of the exhaust purification apparatus of the present embodiment, a temperature sensor (reference numeral 15 in FIG. 1) is disposed on the upstream side of the reduction catalyst, and discernment is performed by monitoring the course of the sensor value and seeing whether or not a state where the amplitude of the exhaust temperature is within the predetermined range has elapsed equal to or greater than a predetermined amount of time. When the exhaust purification apparatus is not equipped with a temperature sensor, whether the exhaust temperature is stable may also be discerned using the exhaust temperature estimated from the operating state of the internal combustion engine.

This step S10 is repeatedly performed until it is discerned that the exhaust temperature is stable.

Next, in step S11, the quantity of ammonia for purification is calculated. Specifically, the operating state of the internal combustion engine and the exhaust temperature are read by the DCU, the flow rate of $NO_x$ flowing into the reduction catalyst is obtained, and the quantity of ammonia for purification that is needed in order to reduce these $NO_x$ is calculated.

Next, in step S12, the quantity of adsorbable ammonia is calculated. Specifically, the temperature of the reduction catalyst is obtained by computation on the basis of sensor values of temperature sensors placed on the upstream side and on the downstream side of the reduction catalyst, and thereafter the estimated adsorption quantity is subtracted from the saturated adsorption quantity corresponding to the temperature of the reduction catalyst, whereby the quantity of adsorbable ammonia is calculated.

Next, in step S13, the quantity of ammonia for purification obtained in step S10 and the quantity of adsorbable ammonia obtained in step S11 are added together, and the quantity of the reducing agent that is needed in order for this combined quantity of ammonia to be generated is calculated.

Next, in step S14, a predetermined quantity is further added to the quantity of the reducing agent calculated in step S12 such that a reducing agent delivery instruction value is determined, and in step S15 thereafter, an instruction to deliver the reducing agent is given with respect to the operation device of the reducing agent injection valve. Thus, some of the ammonia generated from the delivered reducing agent flows out to the downstream side of the reduction catalyst.

At this time, basically the ammonia corresponding to the added reducing agent flows out to the downstream side of the reduction catalyst, but it is preferred to set the quantity of the reducing agent to be added such that the concentration of ammonia that flows out to the downstream side of the oxidation catalyst and is released into the atmosphere becomes equal to or less than a reference value prescribed by exhaust gas regulations. Specifically, in consideration of the oxidation efficiency of the oxidation catalyst obtained at the time of fault diagnosis performed in the past, subtraction is performed such that the concentration of ammonia flowing out to the downstream side of the oxidation catalyst becomes equal to or less than the reference value prescribed by exhaust gas regulations, and the quantity of the reducing agent corresponding to that quantity of the ammonia is decided as the added quantity.

For example, when the reference value of the concentration of ammonia in exhaust gas regulations is 25 ppm, it is 31 ppm if the efficiency with which the ammonia is oxidized by the oxidation catalyst is 20%, it has an upper limit of 100 ppm if the efficiency with which the ammonia is oxidized is 80%, and the quantity of the reducing agent to be added is decided such that ammonia of a concentration equal to or less than this upper limit flows out to the downstream side of the reduction catalyst.

Next, in step S16, the sensor value (s1) of the first $NO_x$ sensor on the upstream side of the oxidation catalyst is read and integration thereof is performed, and the sensor value (s2) of the second $NO_x$ sensor on the downstream side of the oxidation catalyst is read and integration thereof is performed. Further, at the same time, the estimated $NO_x$ reduction efficiency in the reduction catalyst is obtained on the basis of the flow rate, temperature and $NO_x$ concentration of the exhaust gas emitted from the internal combustion engine and the temperature of the reduction catalyst, and the estimated quantity of $NO_x$ on the upstream side of the oxidation catalyst (Nu) is calculated.

Next, in step S17, the ammonia oxidation efficiency (X) in the oxidation catalyst is calculated on the basis of the value (S1) obtained by integrating the sensor value (s1) of the first $NO_x$ sensor, the value (S2) obtained by integrating the sensor value (s2) of the second $NO_x$ sensor, and the estimated quantity of $NO_x$ on the downstream side of the reduction catalyst (Nu). Specifically, as described above, the ammonia oxidation efficiency in the oxidation catalyst is calculated on the basis of the relational expression $X=(S1-S2)/(S1-Nu)$.

Next, in step S18, discernment of whether or not the calculated oxidation efficiency (X) is equal to or greater than a reference value (X0) prescribed beforehand is performed. If the oxidation efficiency is equal to or greater than the reference value (X0), it can be thought that the oxidation catalyst is functioning without any large fault and it is determined that the oxidation catalyst is not faulty. If the oxidation efficiency is less than the reference value (X0), it can be thought that the oxidation catalyst is faulty and that its function of oxidizing the ammonia is dropping, and it is determined that the oxidation catalyst is faulty.

According to the flow of fault diagnosis of the oxidation catalyst described above, the reducing agent delivery instructed quantity is calculated after the quantity of ammonia for purification and the quantity of adsorbable ammonia are obtained. But in a state where the driver has released the accelerator pedal, for example, the quantity of $NO_x$ newly flowing into the reduction catalyst is extremely small and the quantity of ammonia for purification becomes substantially zero. Further, in a state where the quantity of ammonia adsorbed by the reduction catalyst has reached a saturated state, the quantity of adsorbable ammonia becomes zero. For that reason, the DCU may also be configured such that it can detect a state where the driver has released the accelerator pedal and an ammonia adsorption saturated state of the reduction catalyst, and the step of calculating at least one of the quantity of ammonia for purification and the quantity of adsorbable ammonia may also be omitted.

Second Embodiment

Next, an exhaust purification apparatus equipped with an oxidation catalyst fault diagnosis unit pertaining to a second embodiment of the invention will be described. Whereas the exhaust purification apparatus of the first embodiment is equipped with $NO_x$ sensors on both the upstream side and the downstream side of the oxidation catalyst, the exhaust purification apparatus of the present embodiment differs from the exhaust purification apparatus of the first embodiment in that it is not equipped with a $NO_x$ sensor on the upstream side of the oxidation catalyst.

Description will be omitted below in regard to points shared in common with the first embodiment, and points differing from the first embodiment will be described.

Figure 5:
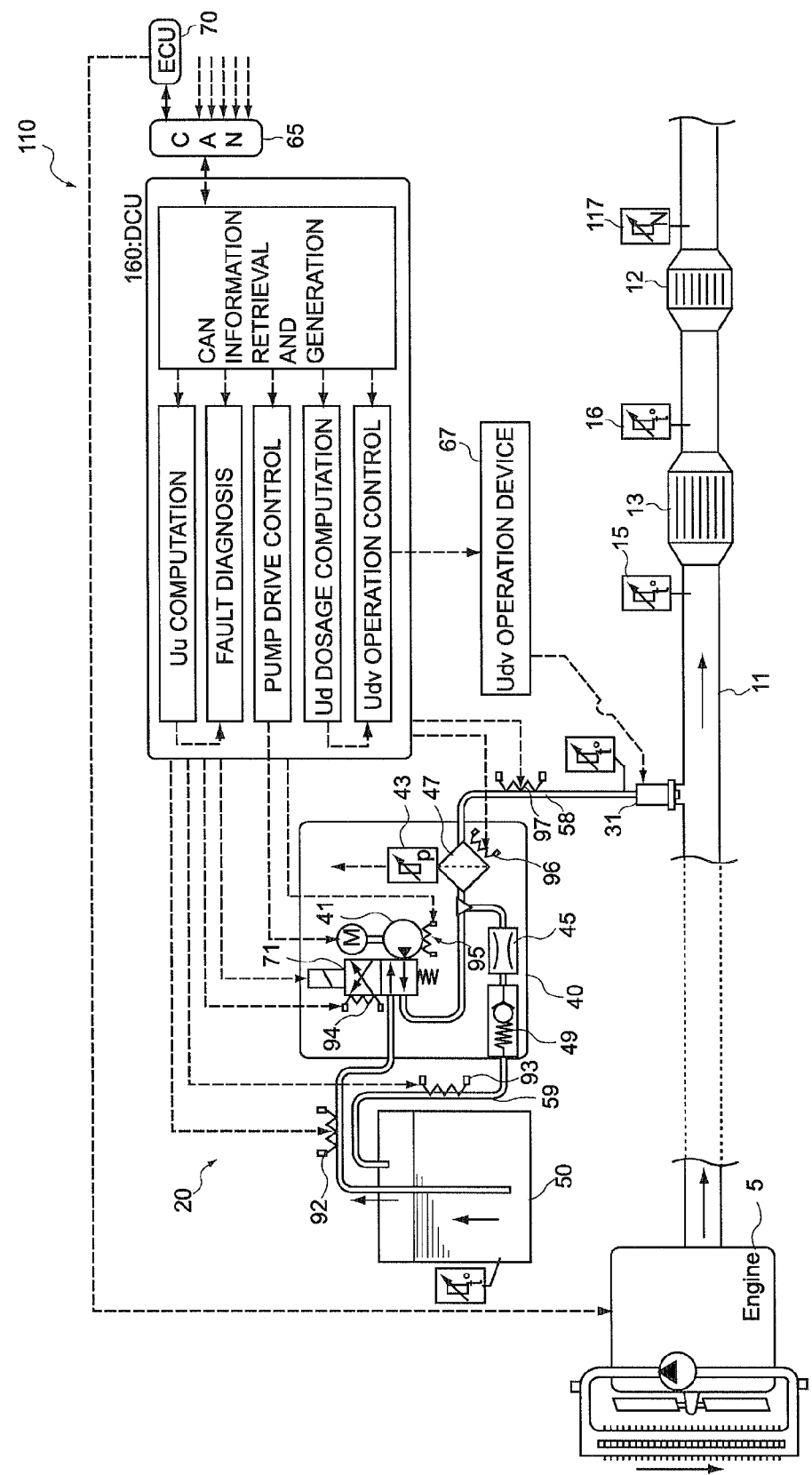
FIG. 5 is a diagram showing a configural example of an exhaust purification apparatus pertaining to a second embodiment of the present invention.

As shown in FIG. 5, an exhaust purification apparatus 110 of the present embodiment is equipped with a $NO_x$ sensor 117 on the downstream side of the oxidation catalyst 12 and is not equipped with a $NO_x$ sensor on the upstream side of the oxidation catalyst 12. Instead, a DCU 160 is equipped with a calculating portion (in FIG. 5, written as "Uu calculation") that estimates the quantity of ammonia on the downstream side of the oxidation catalyst. That is, the exhaust purification apparatus 110 of the present embodiment obtains the quantity of ammonia on the upstream side of the oxidation catalyst using a calculated value rather than a sensor value of a $NO_x$ sensor.

In the oxidation efficiency calculating portion of the DCU 160 disposed in the exhaust purification apparatus 110 of the present embodiment, the ammonia oxidation efficiency in the oxidation catalyst is calculated as follows.

As described in the first embodiment, the ammonia oxidation efficiency (X) is the ratio of the quantity of ammonia that has been oxidized by the oxidation catalyst (Uo) with respect to the quantity of ammonia on the upstream side of the oxidation catalyst (Uu) and is expressed as:

$$X=Uo/Uu \quad (1)$$

Here, in the present embodiment, the quantity of ammonia on the upstream side of the oxidation catalyst (Uu) is obtained by computation by the DCU 160.

Further, considering that the sensor value of the $NO_x$ sensor 117 on the downstream side of the oxidation catalyst is a combined value of the concentration of $NO_x$ and the concentration of ammonia, the quantity of ammonia that has been oxidized by the oxidation catalyst (Uo) is obtained by subtracting a value (S3) obtained by integrating the sensor value (s3) of the $NO_x$ sensor 117 from the combined value of the quantity of $NO_x$ on the upstream side of the oxidation catalyst (Nu) and the quantity of ammonia on the upstream side of the oxidation catalyst (Uu). The quantity of $NO_x$ on the upstream side of the oxidation catalyst (Nu) and the quantity of ammonia on the upstream side of the oxidation catalyst (Uu) are respectively obtained as estimated quantities by computation, so the quantity of ammonia that has been oxidized by the oxidation catalyst (Uo) is expressed as:

$$Uo=(Nu+Uu)-S3 \quad (6)$$

When expression (6) is assigned to the above-described expression (1), the ammonia oxidation efficiency (X) of the oxidation catalyst is expressed as:

$$X=\{(Nu+Uu)-S3\}/Uu \quad (7)$$

As shown in this expression (7), the oxidation efficiency calculating portion of the DCU 160 disposed in the exhaust purification apparatus 110 of the present embodiment calculates the ammonia oxidation efficiency in the oxidation catalyst on the basis of the sensor value of the $NO_x$ sensor and the quantity of $NO_x$ and the quantity of ammonia on the upstream side of the oxidation catalyst which are estimated.

Additionally, like in the first embodiment, the fault determining portion compares the value of the ammonia oxidation efficiency calculated by the oxidation efficiency calculating portion with the predetermined reference value and determines that the oxidation catalyst is faulty when the value of the ammonia oxidation efficiency calculated by the oxidation efficiency calculating portion is less than the predetermined reference value. In this manner, even when the exhaust purification apparatus is not equipped with a $NO_x$ sensor on the upstream side of the oxidation catalyst, it can perform fault diagnosis of the oxidation catalyst on the basis of the ratio of the quantity of ammonia that has been oxidized (Uo) with respect to the quantity of ammonia on the upstream side of the oxidation catalyst (Uu) regardless of the operating state of the internal combustion engine.

The invention claimed is:

1. A method of diagnosing faults in an oxidation catalyst which, in an exhaust purification apparatus of an internal combustion engine that delivers a reducing agent capable of generating ammonia to an exhaust passage on an upstream side of a reduction catalyst and selectively reduces and purifies NOx in exhaust with the reduction catalyst, is placed on a downstream side of the reduction catalyst, the oxidation catalyst fault diagnosis method comprising:

calculating a quantity of ammonia for purification that is needed in order to purify NOx an exhaust flowing into the reduction catalyst;

determining a current estimated adsorption quantity;

determining a saturated adsorption quantity corresponding to a temperature of the reduction catalyst;

calculating an adsorbable quantity of ammonia by subtracting the current estimated adsorption quantity from the saturated adsorption quantity;

setting a dosage of the reducing agent by adding a predetermined quantity to the reducing agent quantity with respect to the adsorbable quantity and the quantity of ammonia for purification;

delivering the reducing agent with the dosage such that a predetermined quantity of the ammonia flows out to the downstream side of the reduction catalyst; and performing fault determination of the oxidation catalyst by comparing a predetermined reference value and an oxidation efficiency (X) where $$X=Uo/Uu$$

Uo is a quantity of ammonia that has been oxidized by the oxidation catalyst and Uu is a quantity of ammonia on the upstream side of the oxidation catalyst, and where the predetermined quantity of ammonia is oxidized and purified by the oxidation catalyst when the predetermined quantity of ammonia passes through the oxidation catalyst.

2. The method according to claim 1, further comprising: calculating the oxidation efficiency on a basis of a value of an upstream-side NOx sensor placed on the downstream side of the reduction catalyst and on the upstream side of the oxidation catalyst, a value of a downstream-side NOx sensor placed on the downstream side of the oxidation catalyst, and an estimated quantity of NOx in the exhaust on the downstream side of the reduction catalyst and on the upstream side of the oxidation catalyst.

3. The method according to claim 1, further comprising: calculating the oxidation efficiency on the basis of an estimated quantity of NOx and an estimated quantity of ammonia on the downstream side of the reduction catalyst and on the upstream side of the oxidation catalyst and a value of a downstream-side NOx sensor placed on the downstream side of the oxidation catalyst.

4. The method according to claim 1, further comprising: performing the fault diagnosis of the oxidation catalyst when an amplitude of the exhaust temperature is within a predetermined range and the exhaust temperature is stable.

* * * * *